United States Patent
Orand et al.

(10) Patent No.: US 9,293,851 B2
(45) Date of Patent: Mar. 22, 2016

(54) ELECTRONIC CONNECTOR HAVING FLEXIBLE REGION

(71) Applicant: Nike, Inc., Beaverton, OR (US)

(72) Inventors: Austin Orand, Portland, OR (US); Brian L. Cash, Portland, OR (US); Aaron B. Weast, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 100 days.

(21) Appl. No.: 13/841,122

(22) Filed: Mar. 15, 2013

(65) Prior Publication Data

US 2014/0273607 A1  Sep. 18, 2014

(51) Int. Cl.
| | |
|---|---|
| H01R 4/50 | (2006.01) |
| H01R 13/625 | (2006.01) |
| H01R 13/05 | (2006.01) |
| H01R 13/405 | (2006.01) |
| H01R 13/502 | (2006.01) |
| H01R 43/00 | (2006.01) |
| H01R 35/02 | (2006.01) |
| H01R 43/24 | (2006.01) |
| H01R 13/56 | (2006.01) |

(52) U.S. Cl.
CPC .............. *H01R 13/05* (2013.01); *H01R 13/405* (2013.01); *H01R 13/5025* (2013.01); *H01R 43/00* (2013.01); *H01R 13/562* (2013.01); *H01R 35/02* (2013.01); *H01R 43/24* (2013.01); *Y10T 29/49117* (2015.01)

(58) Field of Classification Search
CPC .............................. H01R 4/50; H01R 13/6275
USPC .......................... 439/345, 219, 447, 474, 475
See application file for complete search history.

(56) References Cited

U.S. PATENT DOCUMENTS

| | | | |
|---|---|---|---|
| 6,513,532 B2 | 2/2003 | Mault et al. | |
| 7,128,608 B1 | 10/2006 | Chen | |
| 8,517,751 B1* | 8/2013 | Golko et al. | ................... 439/218 |
| 8,535,075 B1* | 9/2013 | Golko et al. | ................... 439/218 |
| 2011/0007468 A1* | 1/2011 | Burton et al. | ............ 361/679.03 |
| 2012/0253485 A1 | 10/2012 | Weast et al. | |
| 2013/0106684 A1 | 5/2013 | Weast et al. | |
| 2013/0217253 A1* | 8/2013 | Golko et al. | ................... 439/345 |

FOREIGN PATENT DOCUMENTS

| | | |
|---|---|---|
| JP | 2004327521 A | 11/2004 |
| JP | 2008031498 A | 2/2008 |
| JP | 2012524638 A | 10/2012 |
| JP | 2013146557 A | 8/2013 |
| JP | 2013532351 A | 8/2013 |
| WO | 2009/710077 A1 | 6/2009 |
| WO | 2011/150403 A1 | 12/2011 |

OTHER PUBLICATIONS

ISR & WO from PCT Application No. PCT/US2014/027138 dated Jun. 4, 2014.

* cited by examiner

*Primary Examiner* — Abdullah Riyami
*Assistant Examiner* — Harshad Patel
(74) *Attorney, Agent, or Firm* — Banner & Witcoff, Ltd.

(57) ABSTRACT

An electronic connector includes a housing and a plug extending from the housing. The plug includes at least one flexible region that provides flexing of the plug. In some example embodiments, the plug also includes at least one rigid region. The plug has at least one interconnect. Each interconnect includes a lead and a contact. The contacts are exposed on an exterior surface of the plug, such exposure being provided so as to enable electrical coupling between the plug and an electronic receptacle into which the plug may be removably inserted.

23 Claims, 6 Drawing Sheets

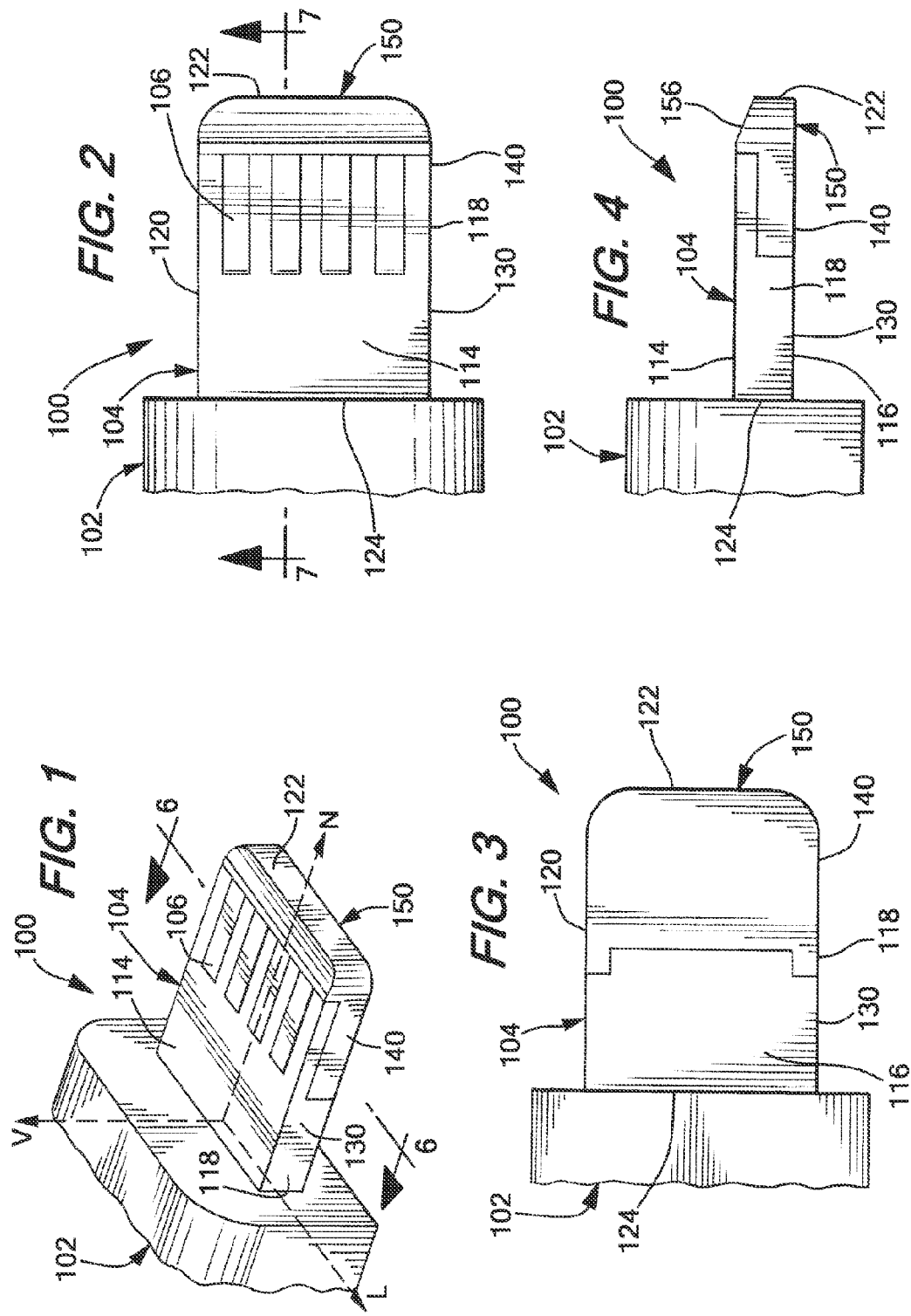

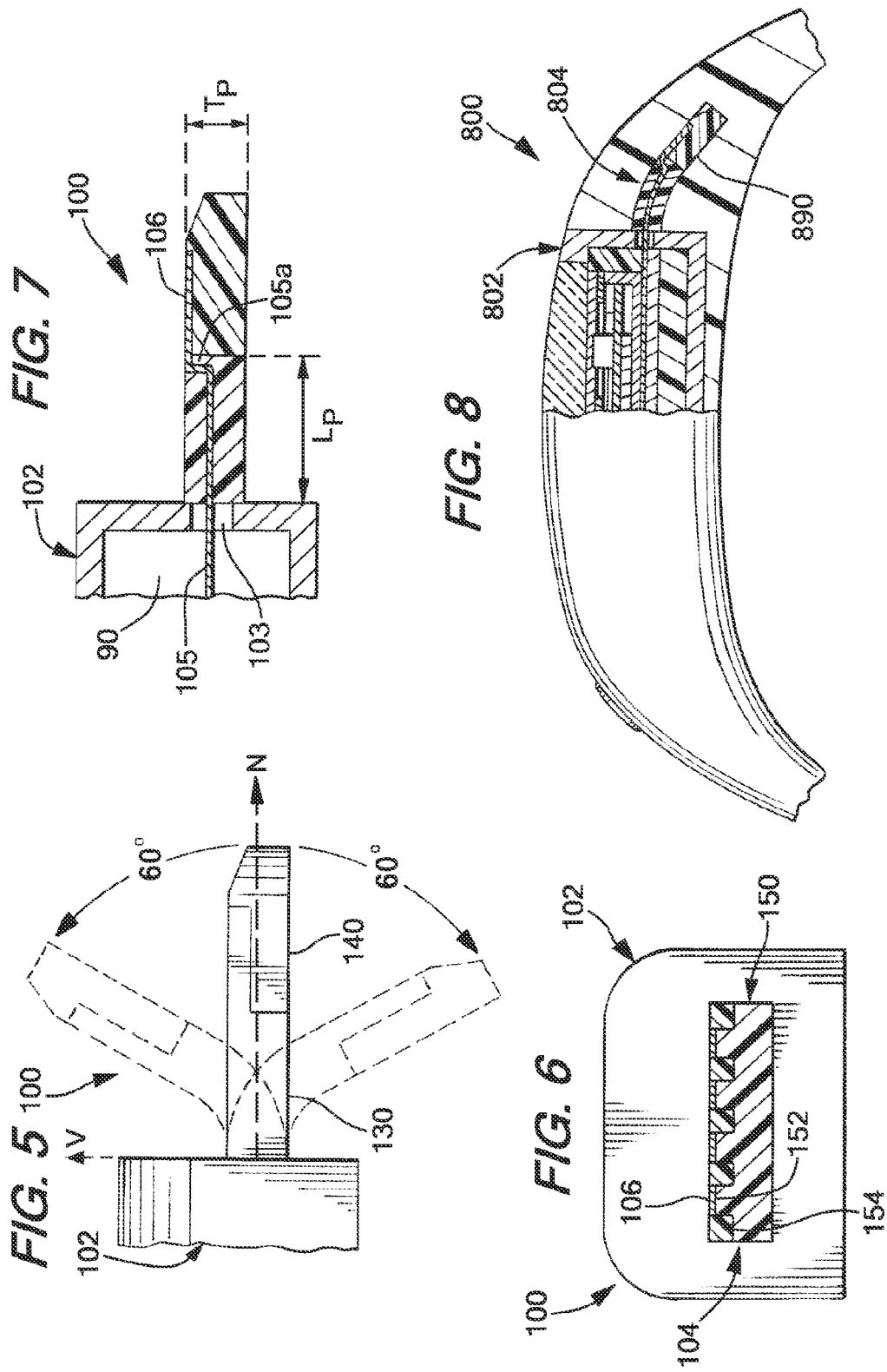

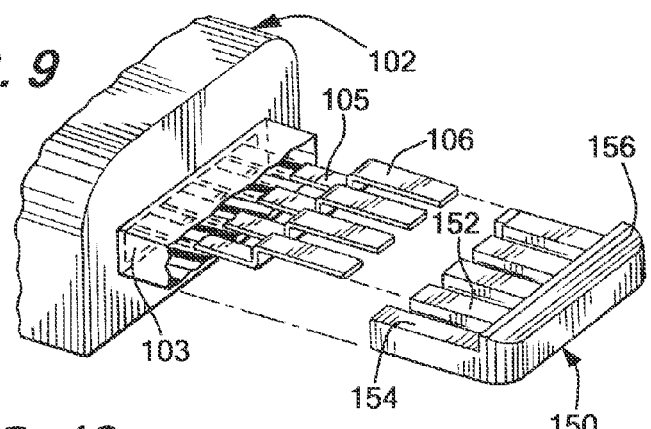
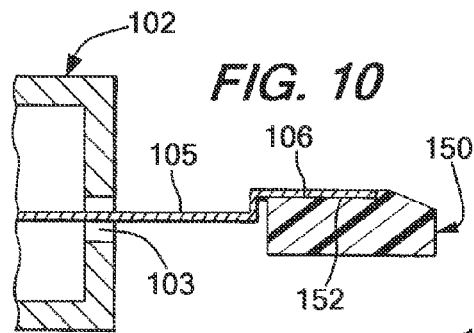
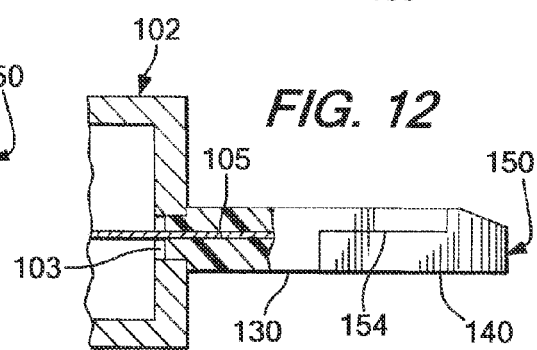
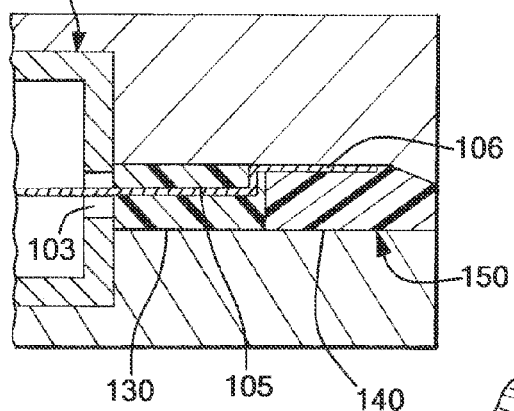
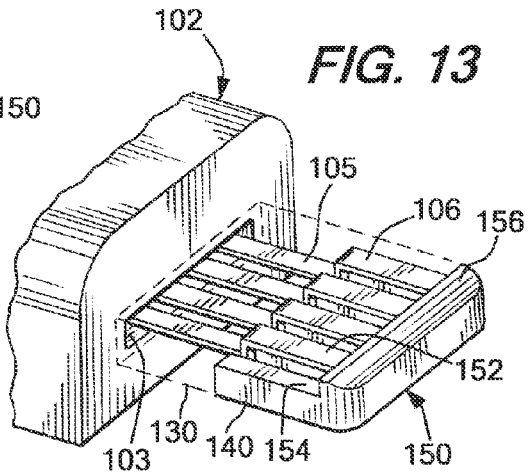

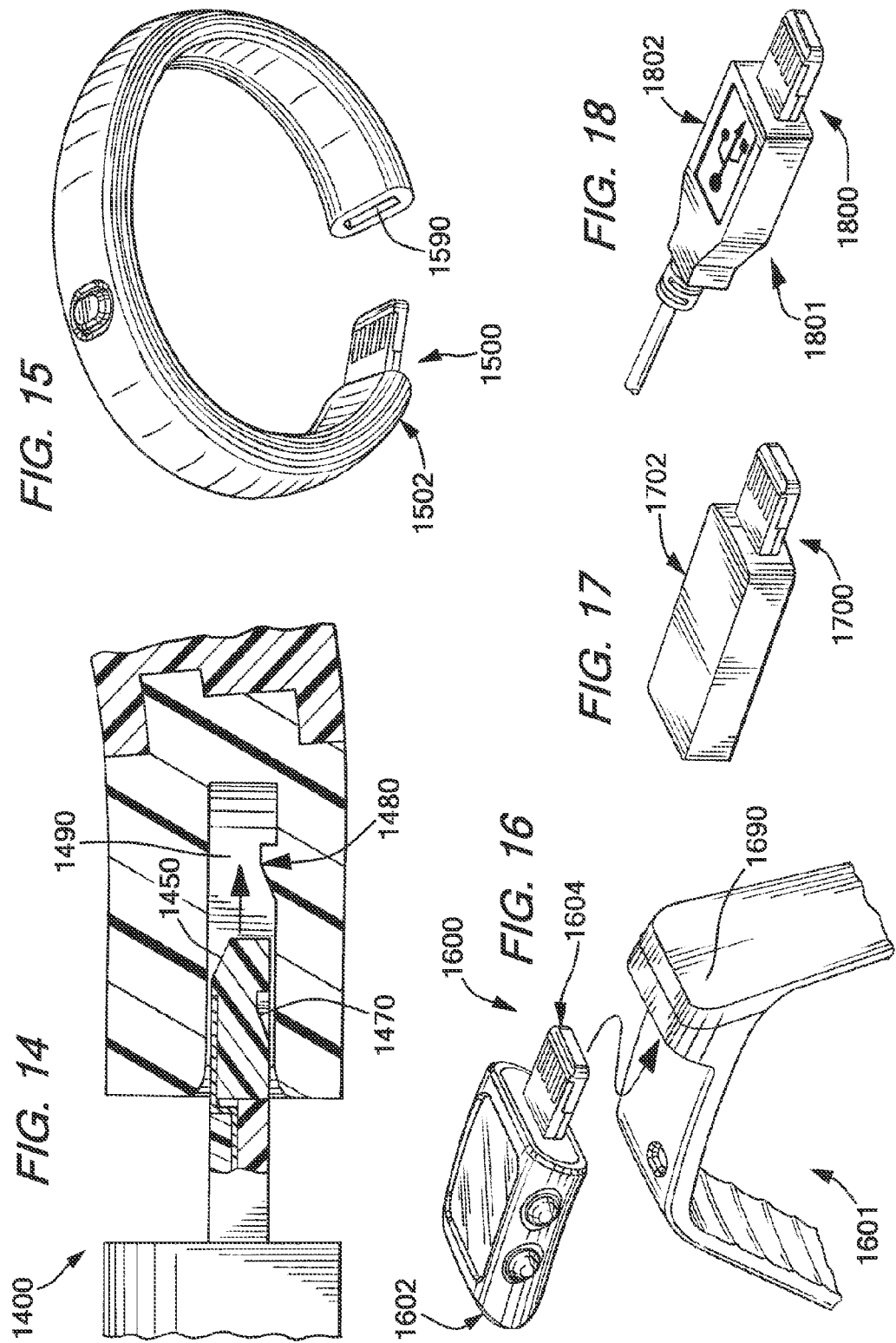

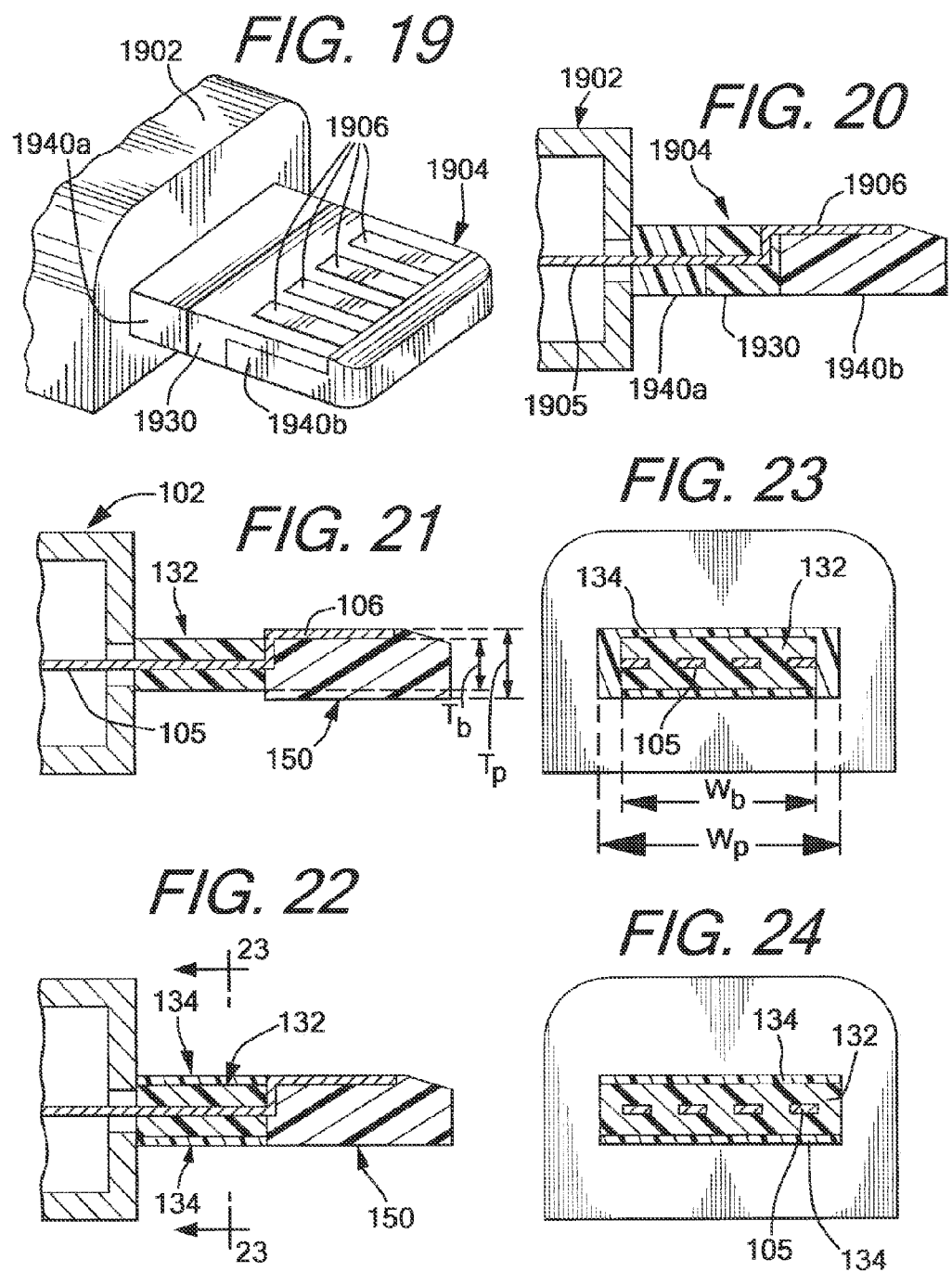

ELECTRONIC CONNECTOR HAVING FLEXIBLE REGION

TECHNICAL FIELD

The invention relates generally to an electronic connector and, more specifically, to a USB or other electronic connector that has at least one flexible region to provide flexing of the connector.

BACKGROUND

Electronic connectors, such as Universal Serial Bus (USB) connectors, are used in a variety of ways for connecting electronic devices to computer systems or other types of processing systems. For example, USB connectors and other electronic connectors are used in the connection of computer peripherals, such as keyboards, mice, digital cameras, printers, portable media players, disk drives, etc., and have also become commonplace on devices such as smartphones, PDAs, and video game consoles. New applications for electronic connectors continue to emerge as new electronic devices of different size, shape, and functionality begin to implement the use of such connectors.

Because of the wide-spread use of electronic connectors, there has been a need to improve many of their features. For example, the standard USB specifications, which can be found at http://www.usb.org/developers/docs/ and are incorporated herein by reference, require the USB connector to have a metal shell. One purpose of the metal shell is that it serves to protect the signals of the metal contacts from electromagnetic interference ("EMI"). The metal shell also facilitates insertion and secure connection of the USB connector into a USB receptacle. Furthermore, the metal shell tends to improve the durability of the USB connector, such as under circumstances of frequent use by users who may not exercise adequate care in the handling of the connector.

Although a metal shell contributes to the rigidity of the USB connector, rigid USB connectors can be limiting and lack versatility in use. For example, rigid USB connectors can be challenging to insert into a USB receptacle, including if the receptacle's access is in any way constrained. Challenging insertion may arise, e.g. in a laptop computer, in connection with the USB receptacle's placement in the computer's back side or, if the laptop computer has a thin profile, by the USB receptacle's placement in an edge such that the receptacle is closely adjacent to any surface on which the computer might be placed. Additionally, rigid USB connectors may not be optimal for uses in which the connectors may be subject to, and endangered by, external forces that may be applied directly or indirectly to the USB connector. Such external forces may arise variously, including during and/or in connection with insertion (e.g., a challenging insertion) of the USB connector into the USB receptacle, or during use of the device employing the USB connector (e.g., while inserted in the receptacle). Thus, it is desirable to have a USB connector that addresses either/both challenges arising with insertion of the USB connector into a USB receptacle and/or dangers associated with external forces. It is also desirable to have electronic connectors other than USB connectors that respond to such challenges and/or dangers. Accordingly, a need exists for electronic connectors that overcome the foregoing and other problems and deficiencies associated with existing connectors.

The present device and method are provided to address the problems discussed above and other problems, and to provide advantages and aspects not provided by prior electronic connectors of this type. A full discussion of the features and advantages of the present invention is deferred to the following detailed description, which proceeds with reference to the accompanying drawings.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the invention relate to electronic connectors, being configured for removable insertion into electronic receptacles, including a housing and a plug extending from the housing. The plug includes a flexible region wherein the flexible region is configured to provide flexing of the plug up to an angle of at least +/−10 degrees from a natural state.

According to one aspect, the flexible region is configured to provide flexing of the plug up to an angle of at least +/−30 degrees from the natural state. In other aspects, the flexible region is configured to provide flexing of the plug up to an angle of at least +/−60 degrees, or +1-90 degrees from the natural state.

According to another aspect, the plug includes a rigid region in association with the flexible region.

According to another aspect, the flexible region includes a flexible beam and the rigid region includes a contact carrier. The flexible beam extends between the housing and the contact carrier.

According to a further aspect, the plug includes one or more leads, at least one of such leads being at least partially embedded within the flexible beam.

According to a further aspect, the plug is further configured for insertion into a non-electronic receptacle having a curved insertion path.

According to a further aspect, the flexible region is formed of one or more materials having a hardness of between 60-100 Shore A.

According to a still further aspect, the contact carrier comprises a plurality of platforms separated by a plurality of recesses that are recessed with respect to the platforms, and wherein the plug further comprises a flexible material forming the flexible region, and the flexible material at least partially fills the recesses.

According to a still further aspect, the rigid region is formed of one or more materials having a hardness of at least 70 Shore D.

Other aspects of this invention relate to electronic devices including a housing, a printed circuit board at least partially within the housing, a plurality of leads in communication with the printed circuit board and extending from the housing, and a connector as described herein. The connector may further include any of the features of the connectors described herein.

According to one aspect, the electronic device is a portable memory storage (e.g. flash memory) drive. In other aspects, the electronic device is a USB cable, a USB adapter, an athletic performance monitoring device, or an electronic watch having a controller and a user interface and a plurality of user inputs operably associated with the controller.

Other aspects of this invention relate to a method for manufacturing an electronic connector including assembling a housing, a plurality of conductive members, and a contact carrier, such that the conductive members extend from the housing and are engaged with the contact carrier. The method further includes molding a flexible polymer material around the conductive members and the contact carrier to connect the contact carrier to the housing and to form a plug extending from the housing. The plug includes a flexible region including the flexible polymer material and a rigid region including the contact carrier. The conductive members have exposed portions forming contacts on an outer surface of the plug to form contacts on the outer surface and embedded portions forming leads extending from the contacts to the housing through the flexible polymer material. The plug is configured for insertion into a receptacle to enable electronic coupling between the plug and the receptacle. The connector may further be manufactured to include any of the features of the connectors described herein.

According to one aspect, the flexible polymer material connects the housing and the contact carrier and extends between the housing and the contact carrier.

According to a further aspect, the contact carrier includes a plurality of platforms separated by a plurality of recesses that are recessed with respect to the platforms, wherein the contacts are engaged with the platforms, and wherein the flexible polymer material at least partially fills the recesses Other features and advantages of the invention will be apparent from the following description taken in conjunction with the attached drawings.

BRIEF DESCRIPTION OF THE DRAWINGS

To allow for a more full understanding of the present invention, it will now be described by way of example, with reference to the accompanying drawings in which:

FIG. 1 is a perspective view of an illustrative embodiment of an electronic connector according to the present invention;

FIG. 2 is a top view of the electronic connector of FIG. 1;

FIG. 3 is a bottom view of the electronic connector of FIG. 1;

FIG. 4 is a side view of the electronic connector of FIG. 1;

FIG. 5 is a side view of the electronic connector of FIG. 1, with the broken lines illustrating the connector in possible flexed states;

FIG. 6 is a cross-sectional view of the electronic connector of FIG. 1, taken along lines 6-6 of FIG. 1;

FIG. 7 is a cross-sectional view of the electronic connector of FIG. 2, taken along lines 7-7 of FIG. 2;

FIG. 8 is a partial cross-sectional view of an example embodiment of an electronic device that can be used in connection with an electronic connector according to aspects of the present invention;

FIG. 9 is an exploded perspective view of the electronic connector of FIG. 1, with portions removed to show detail;

FIG. 10 is a cross-sectional side view of the electronic connector of FIG. 1, prior to molding;

FIG. 11 is a cross-sectional side view of the electronic connector of FIG. 1, during molding;

FIG. 12 is a partial cross-sectional side view of the electronic connector of FIG. 1, after molding;

FIG. 13 is a perspective view of the electronic connector of FIG. 1, with broken lines indicating portions shown as transparent to illustrate internal detail;

FIG. 14 is a partial cross-sectional side view of example embodiments of a locking structure that can be used in connection with an electronic connector according to aspects of the present invention;

FIG. 15 is a perspective view of an example embodiment of an electronic device that can be used in connection with an electronic connector according to aspects of the present invention;

FIG. 16 is a perspective view of an example embodiment of an electronic device that can be used in connection with an electronic connector according to aspects of the present invention;

FIG. 17 is a perspective view of an example embodiment of an electronic device that can be used in connection with an electronic connector according to aspects of the present invention;

FIG. 18 is a perspective view of an example embodiment of an electronic device that can be used in connection with an electronic connector according to aspects of the present invention;

FIG. 19 is a perspective view of another illustrative embodiment of an electronic connector according to the present invention;

FIG. 20 is a cross-sectional view of the electronic connector of FIG. 19, taken along lines 20-20 of FIG. 19;

FIG. 21 is a cross-sectional view of another illustrative embodiment of an electronic connector according to the present invention;

FIG. 22 is a cross-sectional view of another illustrative embodiment of an electronic connector according to the present invention;

FIG. 23 is a cross-sectional view of the electronic connector of FIG. 22, taken along lines 23-23 of FIG. 22;

FIG. 24 is a cross-sectional view of another illustrative embodiment of an electronic connector according to the present invention;

DETAILED DESCRIPTION

Figure 25:
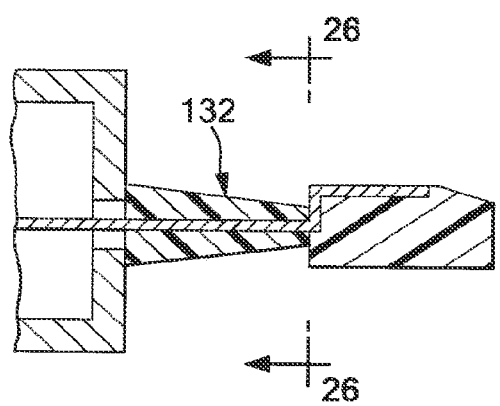
FIG. 25 is a cross-sectional view of another illustrative embodiment of an electronic connector according to the present invention.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

In general, aspects of this invention relate to electronic connectors, such as, in example embodiments, USB connectors. In example embodiments, electronic connectors may include a housing and a plug extending from the housing. The plug includes at least one flexible region. Some aspects of this invention relate to electronic devices that implement electronic connectors, wherein such connectors have at least one flexible region and which electronic devices may include, e.g., a memory storage device (e.g., a USB thumb drive), a USB cable, a USB adapter, an electronic watch, an athletic performance monitoring device, and the like.

The various figures in this application illustrate examples of electronic connectors. When the same reference number appears in more than one drawing, that reference number is used consistently in this specification and the drawings refer to the same or similar parts throughout.

Referring to FIGS. 1-7, an example electronic connector 100 is shown, which connector comprises a housing 102 and a plug 104 extending from the housing 102. The plug 104 comprises at least one flexible region 130. In some example embodiments, the plug 104 may comprise at least one rigid region and/or at least one flexible region.

The plug 104 comprises at least one interconnect. In example embodiments, the plug 104 comprises a plurality of interconnects. In some example embodiments, the plug 104 comprises interconnects in number (and, in some cases, placement, materials, etc.) as prescribed by the electronic connector's connector type (e.g., the connector type may have, among other, prescriptions per a technology standard, such as, for example USB2.0). Each interconnect includes a lead 105 and a contact 106. The contacts 106 are exposed on an exterior surface of the plug 104, distally disposed relative to the housing, such exposure and disposition being provided so as to enable electrical coupling between the plug 104 and an electronic receptacle into which the plug 104 may be removably inserted (herein, the terms "electrical coupling", "electrically coupled" and derivatives of either, are employed to reference any connection that enables communication of signals and/or transmission of electrical power, either or both of which are understood as to electronic connectors).

The leads 105 are electrically coupled with the contacts 106. The leads 105 extend from the housing 102 along the length of the plug 104. In some example embodiments, one or more leads 105 may extend into the housing 102 (e.g., via a hole 103, as described herein and shown in FIG. 7), i.e., in a direction away from the contacts 106. In example embodiments, one or more leads 105 may extend through the housing 102 (e.g., through a hole 103, as described herein and shown in FIG. 7). In example embodiments, one or more leads 105 may be electrically coupled, directly or indirectly, with one or more components (not shown) associated with the connector's electronic device (herein, the term "electronic components" is employed to reference electronic, electrical, electromechanical or other similar components generally, including whether associated with the connector's electronic device or with a receptacle's electronic apparatus, whether active or passive, and whether provided individually or in any group, assembly, module or other arrangement, and including, as examples, circuit boards (populated or otherwise), modules, assemblies, integrated circuits, transistors, diodes, capacitors, inductors, resistors, sensors, actuators, display technologies, crystals, power sources, wiring, connectors, antenna, protection technologies, etc.). In example embodiments, via leads 105, contacts 106 are electrically coupled to the device's electronic components. In some example embodiments, including in the example embodiment shown in FIGS. 1-7, the leads 105 are at least partially embedded, enclosed or concealed within the plug 104, as described in greater detail herein.

The housing 102 may be variously implemented. In the example embodiment illustrated in FIG. 1, the housing 102 is depicted generally, i.e., without depicting any electronic device with which the electronic connector may be associated. In various example embodiments, some of which are depicted in FIGS. 8 and 15-18, the housing 102 may be implemented in, as a portion of, or otherwise in association with, as examples, a memory storage device (e.g., a USB thumb drive), a USB cable, a USB adapter, an electronic watch, or an athletic performance monitoring device. Notwithstanding the foregoing example embodiments, the housing 102 may be implemented in, as a portion of, or otherwise in association with, any other electronic device with which the electronic connector may be associated. In example embodiments, the housing 102 may be any part of an electronic device from which extends the plug 104. In example embodiments, the housing 102 may be understood as the demarcation, or as substantially the demarcation, between the plug 104 and the electronic device with which the electronic connector is associated. In example embodiments, the housing 102 may have one or more aperture(s), via(s), cavity(ies), recess(es), interior(s) or other similar structure(s) (such as interior 90 as illustrated in FIG. 7) so as, e.g., to accommodate (i) one or more leads 105 extending thereinto or therethrough, as herein described and/or (ii) one or more electronic, mechanical, structural or other component(s) (not shown) associated with the connector's electronic device. In some example embodiments, some or all of such aperture(s), via(s), cavity(ies), recess(es) or other similar structure(s) may be filled, e.g. via potting, molding or other fabrication procedures, such as after the leads or any such components have been assembled with respect to the housing 102 per the accommodation purposes of any such structure(s).

The plug 104 of the example electronic connector 100 of FIG. 1 is implemented having a top 114, a bottom 116, sides 118 and 120, a front 122, and a back or rear 124. In the example embodiment shown in FIGS. 1-7, and particularly as shown via FIG. 6, the plug 104 may be substantially rectangular in cross-sectional shape along at least some portion of its length (i.e., as depicted via the cross-section taken along line 6-6 shown in FIG. 1). In other example embodiments, the plug 104 may be shaped differently or variably, e.g., cross-sections may be circular, elliptical, triangular, hexagonal, combinations of these or other shapes, etc. The cross-sectional shape of the plug 104, as well as other physical characteristics (e.g., dimensions, shapes, etc.), may be configured responsive to, among other factors, the intended use of the electronic connector 100, including, as examples, one or more of the shape, size, location, orientation or other physical characteristics of the electronic receptacle into which the plug 104 is configured for removable insertion.

In example embodiments, the plug 104 is configured for removable insertion into compatible electronic receptacles. In example embodiments wherein the plug 104 is configured in accordance with prescriptions of its connector type, compatible electronic receptacles will similarly be configured in accordance with the type's prescriptions. For example, the plug 104 as illustrated in FIGS. 1-7 is configured for removable insertion into USB-type receptacles (e.g., where the USB type is USB2.0, the USB2.0 technology standard prescribes configurations as to both the plug and the receptacle, so as to ensure compatibility, e.g., for electrical coupling therebetween). In some example embodiments, the plug 104 may additionally be configured for removable insertion into one or more non-electronic receptacles (i.e., receptacles that have no electronic components). With such non-electronic receptacles, the plug 104 engages with the receptacles mechanically. FIG. 14 illustrates an example of such a non-electronic receptacle 1490 that the electronic connector 1400 engages mechanically, as described in greater detail below. It is understood that any desired receptacle may be used without departing from this invention.

As described herein, the plug 104 has at least one flexible region 130 that provides flexing of the plug 104. In some example embodiments, one or more flexible region(s) may be implemented toward providing selected flexibility characteristics. In other example embodiments, one or more flexible region(s) may be implemented together with one or more rigid region(s) toward providing selected flexibility characteristics. Such flexibility characteristics may include angular flexing of the plug, e.g., greater than a selected angle, at least of a selected angle, or at least up to a selected angle, or a combination of these angular characteristics. Such flexibility characteristics may also include radii of curvature associated with the plug's flexing, e.g., for respective radii, the radius length and the location for the flex axis to which the radius applies. Such flexibility characteristics may also include directional flexing of the plug, e.g., flex component(s) in one or more selected directions, flex component(s) in one or more selected planes, or the like. Such flexibility characteristics may also include physical parameters, such as resiliency and the like. Such flexibility characteristics may also include radii of curvature associated with the plug's flexing, e.g., for respective radii, the radius length and the location for the flex axis to which the radius applies. Such flexibility characteristics may also be otherwise provided. Such flexibility characteristics may also be provided via plural flexible region(s), which plural flexible regions may be variously implemented.

In example embodiments, the plug's flexible region provides flexing of the plug to a selected angle with respect to a natural state. The "natural state" refers to the state of the plug 104 when it is not acted on by an external force. The selected angle of flexing may be variously implemented, including, in various example embodiments: at least +/−10 degrees from a natural state, at least +/−30 degrees, at least +/−60 degrees, or at least +/−90 degrees. In the illustrative embodiment shown in FIG. 5, the flexible region 130 provides flexing of the plug 104 to an angle of at least +/−60 degrees from a natural state. The flexible region 130 allows for the plug's insertion into a receptacle, in the event that the receptacle is curved along the insertion path it provides to a connector. For example, FIG. 8 shows an example of where the plug 804 flexes when inserted into the non-electronic receptacle 890 of apparatus 800, which receptacle 890 curves along the path of connector insertion. Also, the flexible region 130 allows for insertion of the plug 104 when accessing a USB receptacle, particularly wherein the accessibility is in any way constrained (e.g. in a laptop computer, by placement of the USB receptacle in the computer's back side or, if the laptop computer has a thin profile, by placement of the USB receptacle in an edge such that the receptacle is closely adjacent to any surface on which the computer might be placed). The flexible region 130 may also improve the durability of an electronic connector by helping absorb external forces that may act on the electronic connector. The flexible region 130 may also improve the aesthetics of an electronic device by eliminating design constraints associated with a rigid, or more rigid, electronic connector.

In example embodiments, the plug 104 may flex elastically to a selected angle within the ranges herein described such that the plug 104 does not fracture or undergo any substantial permanent deformation. In example embodiments, the plug 104 can return to its natural state after flexing. In other example embodiments, flexing of the plug 104 to the selected angle within the ranges herein described may result in at least some permanent deformation, but without fracture. Flexing of the plug 104 may decrease the maximum potential insertion distance. In example embodiments, the length of the plug 104, e.g. measured from the housing 102 to the front of the plug 122, may be increased when used with a plug 104 having one or more flexible regions. In example embodiments, the length of the plug 104 may be greater than the length of a standard USB (e.g., where the USB type is USB2.0, the USB2.0 technology standard prescribes configurations as to both the plug and the receptacle, so as to ensure compatibility, e.g., length of the plug). In one example, the plug 104 may be longer than a standard USB plug by 1 millimeter.

In example embodiments, such as the example embodiment illustrated in FIG. 5, the plug 104 is illustrated as flexing vertically, with a flex axis disposed or substantially disposed in a direction lateral to and along the central/neutral axis of the plug 104. Indeed, in FIG. 5, the plug's vertical flexing may be provided via the flex axis being disposed not only along the central/neutral axis, but also along the vertical axis. It is understood that in example embodiments, the flexible region 130 may provide flexing of the plug 104 along multiple different flex axes. In example embodiments, flexing may be along one or more flex axes, any which axis may have components along one or more of the central/neutral axis N, the lateral axis L, and/or the vertical axis V, as shown in FIG. 1. In various example embodiments, the flexible region 130 may provide vertical, horizontal, and/or rotational flexing of the plug 104. Such flexing may be, in some example embodiments, so as to provide angular flex characteristics, as described herein. In other embodiments, the flexible region 130 may provide flexing of the plug 104 in any or all of the six degrees of freedom of the plug 104. The flexing of the plug 104 along these different axes and degrees of freedom may be similar to the flexing herein described.

In example embodiments, the flexible region 130 may be an identifiable portion of the length of the plug 104. In some example embodiments, the entire plug 104 may be flexible, and therefore the entire plug 104 may be referred to as the flexible region 130. In such an embodiment, the plug 104 may be made from a material that provides flexing of the plug 104 to a selected angle with respect to a natural state, while also having sufficient hardness to resist damage, while also having a sufficiently low coefficient of friction for ease of insertion and for minimal wear and tear. In other embodiments, the plug 104 may have multiple flexible regions 130 with the same or different flexibilities. In example embodiments, a flexible region 130 may have varying flexibility throughout.

The plug 104 may contain portions made of several different materials, including polymeric materials, reinforced polymeric materials or other composites, and other types of materials. The plug's flexible region 130 may be formed, at least in part, of flexible materials such as thermoplastic polyurethane (TPU), thermoset elastomers such as polyurethane or natural rubber, silicone materials, cast silicone, cast urethanes, epoxies, thermoplastic elastomers (TPE), or any other moldable elastomer or other polymeric and/or composite materials with properties that meet the specifications as described herein. In example embodiments, the flexible region 130 may be formed of one or more materials having a hardness of about 60-100 Shore A, such as around 80 Shore A for example. It is further understood that such materials may be selected for properties such as strength, resilience, flexibility, bonding capability, compatibility with other materials, among others. Such materials may be formed in one of a variety of configurations and/or using a variety of different forming methods, without departing from the scope of the invention.

In example embodiments, the plug 104 may omit any rigid region 140, such that the entirety or substantial entirety of the plug 104 may be flexible. In other example embodiments as described herein, the plug 104 may comprise at least one rigid region 140. In some example embodiments, the plug 104 may comprise plural rigid regions. In general, a rigid region 140 has a flexibility that is less than the flexibility of the flexible region 130. In some example embodiments, the rigid region 140 has a flexibility that is substantially less than the flexibility of the flexible region 130, or some portion of the flexible region 130. In some example embodiments, the rigid region 140 may be an identifiable portion of the length of the plug 104. To illustrate, as to the example embodiment shown in FIGS. 1-7, the rigid region 140 extends from the flexible region 130 to the front of the plug 122. In another embodiment, the plug 104 may omit any or substantially any readily identifiable rigid region 140, but wherein the rigid region, in use, exhibits no, or substantially no, or otherwise insignificant, flexibility, at least relative to the flex associated with the one or more flexible regions. The rigid region 140 may have a constant flexibility, or varying flexibility in different portions, in various example embodiments. In example embodiments, the plug 104 may have multiple rigid regions 140 with the same or different flexibilities. For example, FIGS. 19 and 20 show a plug 1904 having a similar structure to the plug 104 herein described, with an additional rigid region. The plug 1904 includes a flexible region 1930 that is located between a first rigid region 1940a and a second rigid region 1940b. The first rigid region 1940a in this example embodiment is located between the housing 1902 and the flexible region 1930 and is connected to one end of the flexible region 1930. The second rigid region 1940b in this example embodiment is connected to an opposite end of the flexible region 1930 and forms the end of the plug 1904. In example embodiments, the rigid material of the rigid region 1940a may extend or penetrate into the flexible region 1930, and/or the flexible material of the flexible region 1930 may penetrate into the rigid region 1940a. This extension of rigid region 1940a may provide a structure for the leads 1905 to pass through in the flexible region 1930. In other example embodiments, the plug 1904 may include additional flexible or rigid regions throughout, including, e.g., various sequences of flexible regions and rigid regions, such as having selected alternations from the housing to the front of the plug. As an example, a sequence of flexible regions and rigid regions may be implemented wherein: starting adjacent the housing 102, plural rigid regions may be provided, with each such region in sequence having decreasing rigidity; followed by plural flexible regions, through to the contacts 106, each region in sequence having increasing flexibility (or, as an alternative, having such increases, followed by one or more latter regions having decreasing flexibility); followed by one rigid region, which region has a fixed, relatively high rigidity (e.g., potentially accompanied by a relatively low friction coefficient).

In example embodiments, the rigid region 140 is formed at least partially of a low friction, high strength material, such as glass filled polypropylene, acetal materials, polycarbonates (PC), acrylonitrile butadiene styrene (ABS), and nylon, to allow for easy insertion into a receptacle. The material of the rigid region 140 may also be selected to bond with the material of the flexible region used during the overmolding process that forms plug 104, as herein described. Such materials may be formed in one of a variety of configurations and/or using a variety of different forming methods, without departing from the scope of the invention. In example embodiments, the rigid region 140 may be formed of one or more materials having a hardness of at least 70 Shore D.

In example embodiments, the plug 104 includes a contact carrier 150. In the example embodiment illustrated in FIG. 7, the contact carrier 150 is located within the rigid region 140 and provides rigidity to the rigid region 140. In this example embodiment, a portion of the length of the rigid region 140 includes at least some of the flexible material of the flexible region 130. However, in this example embodiment, the rigidity of the contact carrier 150 prevents the rigid region 140 from flexing to the degree of the flexible region 130 as herein described. As seen in FIGS. 2 and 4, the contact carrier 150 in this embodiment has a nose 156 that is beveled at the front of the plug 122. The length and angle of the bevel may differ without departing from this invention. The beveled nose 156 helps to ease insertion of the plug 104 into a receptacle and avoid forces that can cause buckling of the connector 100, as well as helps prevent damage to the contacts 106 and the flexible region 130. The contact carrier 150, as seen in FIGS. 1-3, also has curved surfaces on the sides 118, 120 at the front of the plug 122. In other embodiments, there may also or alternatively be beveled and/or curved surfaces on the bottom and/or sides of the front of the plug 122.

As seen in FIG. 6, the contact carrier 150 may include a plurality of platforms 152 separated by a plurality of recesses 154 that are recessed with respect to the platforms 152. In the example embodiment illustrated in FIG. 6, the contact carrier 150 comprises four platforms 152 that conform to the length, width and depth of the contacts 106, such that the contacts 106 will be implemented on the top surface of the plug 114 enabled to electrically couple with an associated electronic receptacle. In other embodiments, the number of platforms 152 and dimensions of the platforms 152 may be different without departing from the invention. The contacts 106 may be mounted on, engaged with, and/or otherwise supported by the platforms 152, as shown in FIGS. 6-7 and 13. Also, the flexible material (as herein described in reference to the flexible region 130) may at least partially fill the recesses 154, as shown in FIG. 6. This interlocking between the flexible material and the contact carrier 150 improves the bonding between the components. In other embodiments, the contact carrier 150 may have a different structure or different dimensions. For example, the carrier 150 may have platforms 152 that each support multiple contacts 106, or a single platform or other surface that supports all of the contacts 106.

In example embodiments, the contact carrier 150 may include a locking component. FIG. 14 shows a contact carrier 1450 having a locking component 1460 configured to engage a complementary structure in a non-electronic receptacle 1490. In FIG. 14 the locking component 1460 includes a notch 1470 in the bottom surface of the contact carrier 1450. When electronic connector 1400 is inserted into the non-electronic receptacle 1490, the notch 1470 engages a complementary structure 1480 in the receptacle 1490, whereby the connector 1400 may be removably retained in such receptacle 1490. In the example embodiment depicted in FIG. 14, the connector 1400 is removable from the receptacle 1490, e.g., by pulling with sufficient force. In example embodiments, the locking structure on the receptacle 1490 and/or the connector

1400 may include a moving component that can be mechanically actuated to release (and/or effect) the engagement. It is understood that other types of receptacles, including electronic receptacles, may include structure for engaging the locking component 1460 of the plug 104.

Figure 29:
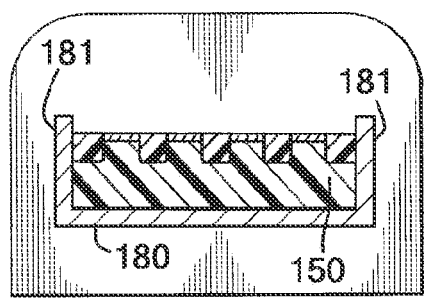
FIG. 29 is a cross-sectional view of another illustrative embodiment of an electronic connector according to the present invention.
Figure 30:
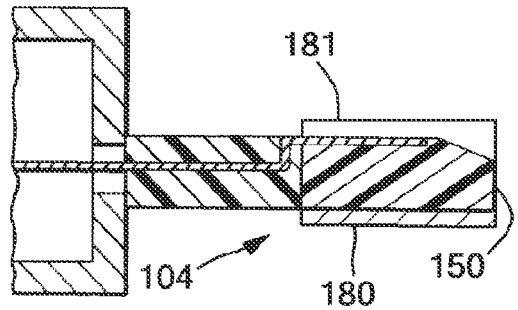
FIG. 30 is a cross-sectional view of another illustrative embodiment of an electronic connector according to the present invention.

In example embodiments, as shown in FIGS. 29 and 30, the contact carrier 150 may be partially enclosed by a shell 180. It is understood that e.g., where the USB type is USB2.0, the USB2.0 technology standard prescribes configurations as to the metal shell enclosing the plug. In example embodiments, a partial shell 180 encloses at least a portion of the contact carrier 150 and is configured to prevent incorrect insertion of the plug 104 into a receptacle. For example, in FIGS. 29-30, the plug 104 has a metal shell 180 contacting the underside and sides of the contact carrier 150, with metal extensions 181 extending above the top of the contact carrier 150. The metal extensions 181 of the shell 180 may strike or abut portions of the receptacle during attempted incorrect insertion of the plug 104, thereby preventing incorrect insertion of the plug 104. The metal extensions 181 and the shell 180 generally will enhance ease of insertion due to the low coefficient of friction of the metallic material, while also resisting wear and tear.

Figure 26:
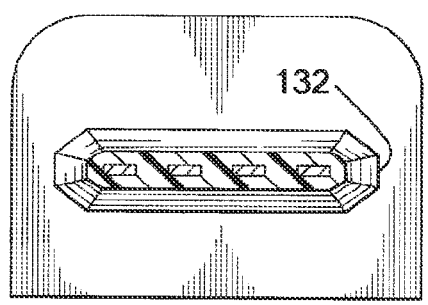
FIG. 26 is a cross-sectional view of the electronic connector of FIG. 22, taken along lines 26-26 of FIG. 25.
Figure 27:
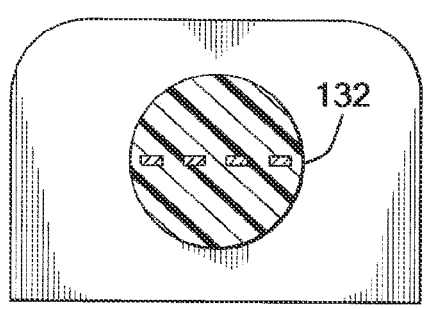
FIG. 27 is a cross-sectional view of another illustrative embodiment of an electronic connector according to the present invention.

The plug 104 as shown in FIGS. 1-8 and other embodiments herein includes a beam 132 that extends from the housing 102 to the contacts 106 and/or to the contact carrier 150 and/or to the plug's front. In example embodiments, the beam 132 at least partially embeds the leads 105. The beam 132 may provide the plug's shape, e.g., from the housing 102 to the contacts 106 and/or contact carrier 150 and/or the plug's front. In the embodiment illustrated in FIG. 7, the beam 132 has a thickness that is the same, or substantially the same, as the maximum thickness of the plug $T_p$, over at least a portion of the length of the plug $L_p$. In example embodiments, the beam 132 may have a variable thickness and/or other structural features. For example, as shown in FIGS. 21-24, the beam 132 has a thickness $T_b$ that is less than the thickness of the plug $T_p$. The width of the beam $W_b$ may also be less than the maximum width of the plug $W_p$, as seen in FIG. 23. The thickness $T_b$ and/or the width $W_b$ of the beam 132 may also be tapered, as seen in FIGS. 25 and 26. The example embodiment of FIGS. 25 and 26 illustrates the top, bottom, and side surfaces of the beam 132 being angled inwardly to create the tapered thickness $T_b$ and width $W_b$. In other embodiments, some of these surfaces may be straight (parallel to the centerline of the beam 132), and one or more of the surfaces may be angled to create a tapered thickness $T_b$ and/or width $W_b$. In further embodiments, the tapered beam 132 may have a circular, elliptical or other curved cross-section, with a conical or curvilinear taper. In further embodiments, the tapered beam 132 may have varying cross-sections along the length of the beam 132, which cross-sections may include various sequences, transitions, or combinations of rectangles, ellipses, circles, and/or other shapes, with tapers variously provided among any such cross-sections.

Figure 28:
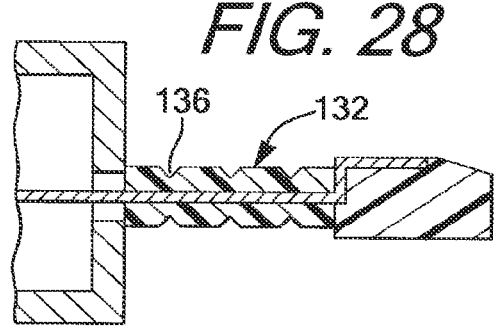
FIG. 28 is a cross-sectional view of another illustrative embodiment of an electronic connector according to the present invention.

In example embodiments, the beam 132 may be formed with joints 136, as seen in FIG. 28. The joints 136 in FIG. 28 are formed by recesses or reduced thickness portions of the beam 132, although other embodiments may include joints formed by different structure. Joints 136 may increase the flexibility of the beam 132. Joints may improve the beam's ability to resist substantial permanent deformation. It is understood that the joints 136 being formed by recesses in the top and bottom surfaces of the beam 132 increases the vertical flexibility of the beam 132. In other embodiments, the beam 132 may additionally or alternately include joints 136 in other surfaces, and/or among, across or otherwise involving plural surfaces, and/or in other configurations, which may increase the flexibility of the beam 132 in other directions, including horizontally, diagonally, and/or rotationally. In example embodiments, it is understood that the beams 132 as illustrated in FIGS. 25-28 may be surrounded by additional structure 134, such as a shell or coating of another material, including a material that has greater or less flexibility than the material of the flexible region 130 as herein described (e.g., such that the plug's cross-section may be provided by the combination of the beam and such covering material), or may be uncovered. Structure 134 may be a part of the flexible region 130, having the same or different flexibility of beam 132. Alternatively, structure 134 may be a part of the rigid region 140 (e.g., where the USB type is USB2.0, the USB2.0 technology standard prescribes configurations as to the material of the plug). In example embodiments, the beam 132 may form or otherwise provide one or more flexible region(s) 130 of the plug 104. In example embodiments, the beam 132 may form or otherwise provide one or more rigid region(s) 140 of the plug 104. In example embodiments, the flexible portion 130 and the leads 105 together form the entire thickness of the beam 132 over at least a portion of the length of the beam, which permits the beam 132 to flex at least at the flexible portion 130, e.g., in FIG. 7.

In the embodiment shown in FIGS. 1-7, the leads 105 are embedded within and extend through the flexible region 130 and connect to the contacts 106. As illustrated in FIG. 5, the leads 105 are positioned generally along the central/neutral axis of the plug 104. It is understood that in other embodiments, the leads 105 may be positioned along different axes and not along the central/neutral axis of the plug 104. The positions of the leads 105 may influence the flexibility of the flexible portion 130 and/or the amount of stress acting on the leads 105 during flexing. Additionally, the length of the leads 105 may change respectively with the length of the contacts 106. The contacts 106 are shaped and arranged in a specific pattern, such as to engage other contacts that have a specified pattern. For example, the contacts 106 in FIGS. 1-7 are shaped and arranged to engage the contacts of a USB receptacle. However, the contacts 106 may be shaped and arranged in other patterns without departing from this invention, such as if a different type of connection is desired. Any desired contacts and/or electrical coupling structure may be used without departing from this invention, including conventional contacts and/or electrical coupling structures as are known and used in the art. The leads 105 and contacts 106 may be made of a resilient metal or other conductive material having low electrical resistance/high conductivity and capable of multiple flexures without substantial permanent deformation or breakage that may disrupt the operation of the leads 105 or contacts 106. Examples of such materials include, hardened stainless steel (e.g., Full Hard Stainless Steel 302/304), spring tempered steel (e.g., Blue Temper 1095 spring steel), or beryllium copper. In example embodiments wherein combinations of metals are employed, e.g., as alloys or otherwise, the combinations may be so employed so as to achieve various performance requirements, targets, or other goals. Such goals may include, alone or in combination, e.g., optimizing corrosion resistance, obtaining a selected flexibility, obtaining a selected resilience, and/or providing a selected electrical conductivity/resistance. The leads 105 and/or contacts 106 may also have a coating such as gold or nickel to achieve various performance requirements, targets, or other goals, as herein described. An example embodiment of a method for fabricating an electronic connector 100 using overmolding techniques is illustrated in FIGS. 9-13. The housing 102 and the contact carrier 150 are separately manufactured to include various selected structural features. Such selected structural features may include one or more of those herein described, including, for example, an opening 103 in the housing 102 and the nose 156, platforms 152 and recesses 154 of the contact carrier 150. In example embodiments, the contact carrier 150 is molded, e.g., injection molded. The contact carrier 150 may be manufactured using different techniques in other embodiments, such as, e.g., machining. The metal interconnects (having integrated leads 105 and contacts 106) are formed of one or more respective conductive members, such as by stamping, machining welding or other construction technique.

During fabrication, as seen in FIG. 10, the housing 102, the interconnects (as to leads 105 and contacts 106), and the contact carrier 150 are placed in their respective locations within an overmold tool. The leads 105 are inserted into the housing 102 such that they extend from the opening 103, toward contact carrier 150. The opening 103 provides access to the interior 90 of the housing 102. In some example embodiments, the opening 103 may be rectangular (or generally rectangular) in shape; in other example embodiments, the opening 103 may be shaped or configured other than rectangular, e.g., circular, elliptical, triangular, hexagonal, etc. In some example embodiments, in this fabrication of the electronic connector, or in some other fabrication, the leads 105 may be electrically coupled to one or more electronic components, which components may be disposed in the housing's interior 90 or otherwise associated with the connector's electronic device. The contacts 106 are placed in engagement with respective platforms 152 of the contact carrier 150, so as to become mounted on such platforms 152 via the overmolding process. In examples of fabrication, the contacts 106 may be engaged and held in place with the contact carrier 150, such as by a bonding material or an engaging structure on the carrier 150, so that the contacts 106 do not move out of position during the over-molding process.

The overmold tool is used to hold the housing 102, the interconnects (as to leads 105 and contacts 106), and the contact carrier 150 in their respective positions during the overmolding process. To illustrate with reference to FIG. 11, the housing 102, the leads 105, the contacts 106, and the contact carrier 150 are held in their respective positions, while a flexible polymer material is injection molded, filling the spaces around the housing 102, the leads 105, the contacts 106, and the contact carrier 150. The over-mold flexible polymer material forms a beam 132 that connects the contact carrier 150 to the housing 102. The combination of the flexible material, the leads 105, the contacts 106, and the contact carrier 150 forms a flexible plug 104 that extends from the housing 102. The over-mold flexible polymer material may also hold all of the foregoing components together, including the housing 102, the leads 105, the contacts 106, and the contact carrier 150. In example embodiments, such as the example embodiment depicted in FIG. 6, the over-mold flexible polymer material fills in the recesses 154 of the contact carrier 150 which enhances bonding as herein described. Additionally, the flexible polymer material may penetrate between the rearmost end of the contact carrier 150 (i.e. the leftmost end in FIG. 7) and the leads 105, such that the downward bend 105a of the leads 105 is spaced from the rear edge of the contact carrier 150 in one embodiment. This configuration may reduce forces on the contact carrier 150 and the contacts 106 and/or leads 105 during flexing of the plug 104, by absorbing and/or dissipating compressive forces that may be exerted on the flexible region 130 by the rear edge of the contact carrier 150 during flexing. In example embodiments, such as the embodiment depicted in FIG. 12, the over-mold flexible polymer material extends or penetrates into the opening 103, which may enhance bonding, e.g., between the plug 104 and the housing 102. Additionally, in example embodiments, the over-mold flexible polymer material may create a water tight seal between the housing 102 and the plug 104.

As seen in FIGS. 12 and 13, the plug 104 resulting from this manufacturing process has (i) a flexible region 130 formed by the flexible polymer over-mold material and (ii) a rigid region 140 formed at least partially by the contact carrier 150, as herein described. The over-mold process leaves the contacts 106 exposed. Other overmolding techniques and other types of techniques, may be utilized to form the plug 104 in the configuration illustrated, as well as other configurations, in other embodiments. For example, in an alternate example embodiment, the flexible material may be formed by a casting or potting process, which may be done at room temperature. In other example fabrications, the housing 102 and plug 104 may be connected other than via overmolding the housing 102, leads 105, contacts 106 and contact carrier 150. As examples, the housing 102 and the plug 104 may be separately constructed and, thereafter, connected, e.g., via use of fasteners, via use of adhesives or other bonding materials, via welding (e.g., ultrasonic welding). In still other example fabrications, the plug 104 and housing 102 may be integrally formed via overmolding the interconnect, the interconnect thereby providing leads 105 and contacts 106. In other example fabrications, the plug 104 and housing 102 may be integrally formed via machining or molding, with leads and contact being provided thereafter (e.g., via insertion of interconnect into predetermined channels, or via deposition techniques of otherwise, or via some combination of these techniques, with or without other techniques). In other example embodiments, the beam 132 and contact carrier 150 may be integrally formed together, and structure 134 thereafter formed via overmolding the structure 134 to the beam 132 and contact carrier 150.

Various electrical devices may incorporate various embodiments of the electronic connector 100. For example, FIG. 15 illustrates an embodiment of an electronic connector 1500 (as herein described) used in connection with a computerized athletic performance monitoring device 1501, which device 1501 includes housing 1502, and where the connector 1500 is configured for insertion into a USB receptacle. In this example embodiment, during physical activity, the connector 1500 is engaged by a non-electronic receptacle 1590, i.e., so as to retain the device 1501 on the user's arm. Thus, the connector 1500 in this example embodiment may benefit from flexibility in certain directions so as to provide easier insertion and better fit into the receptacle 1590 and also to better absorb anticipated and consequential forces encountered in active/athletic use. Examples of an athletic performance monitoring device as shown in FIG. 15, used in connection with an electronic connector are described in U.S. patent application Ser. No. 13/287,047, filed Nov. 1, 2011, and published as U.S. Patent Application Publication No. 2012/0253485, which is incorporated by reference herein and made part hereof.

FIG. 16 illustrates an embodiment of an electronic connector 1600 as herein described used in connection with an electronic watch 1601 that includes housing 1602 having a controller 1620 and a user interface 1630 with a plurality of user inputs operably associated with the controller. The watch 1601 includes a receptacle 1690 that receives the connector 1600 during use of the watch, which receptacle 1690 may be either an electronic or non-electronic receptacle. The plug 1604 may be further configured for being disconnected and plugged into a USB receptacle of a separate apparatus, e.g., a computer, such as for data upload/download. The watch 1601 may also include athletic performance monitoring capability, and may include various electronic components to enable that capability. Thus, the connector 1600 in this example embodiment may also benefit from flexibility to provide easier insertion and better fit into the receptacle 1690 and to better absorb forces encountered in active/athletic use. Examples of a watch having a controller and a user interface and a plurality of user inputs operably associated with the controller used in connection with an electronic connector, as shown in FIG. 16, are described in U.S. patent application Ser. No. 12/767,288, filed Apr. 26, 2010, and published as U.S. Patent Application Publication No. 2011/0003665, which is incorporated by reference herein and made part hereof.

FIGS. 17 and 18 illustrate additional embodiments. FIG. 17 illustrates an embodiment of an electronic connector 1700 as herein described used in connection with a portable memory storage (e.g. USB thumb drive) device 1701 that includes a housing 1702. The connector 1700 in FIG. 17 is configured to be received in a USB port. FIG. 18 illustrates an embodiment of an electronic connector 1800 as herein described used in connection with a connection (e.g., USB) cable 1801 that includes a housing 1802. The electronic connector 1800 is configured to be received in a USB port. Although not shown in FIG. 18, the connection cable 1801 in this example embodiment may be attached to a variety of apparatuses, via a receptacle of each respective apparatus, such apparatuses including, e.g., computer peripherals (such as keyboards, mice, and displays), digital cameras, printers, portable media players, storage units (e.g., disk drives), smartphones, PDAs, and video game consoles, among other apparatuses, and may be used to connect such apparatuses to other apparatuses, devices and/or power sources. The memory drive 1701 and the connection cable 1801 may benefit from the increased flexibility provided by the connectors 1700, 1800, to create a wider range of applications and uses. Still other uses and applications of the electronic connector 100 are contemplated within the scope of the invention and are recognizable to those skilled in the art.

Several different embodiments have been herein described, including the example embodiments shown in FIGS. 1-18. It is understood that any of the features of these various embodiments may be combined and/or interchanged. For example, in the embodiments herein described and shown in FIGS. 15-18, the plug 104 may remain straight or partially flexed during use as herein described with respect to FIGS. 5 and 8. Additionally, the electronic connectors in the example embodiments herein described and shown in FIGS. 8 and 15-18 may have any other configuration or variation herein described with respect to FIGS. 1-7, 9, 13 and 14. Further, all of the embodiments illustrated in FIGS. 1-18 contain contacts 106 on the top of the plug 114. However, in other embodiments, the bottom 116, the sides 118, 120, and/or the front of the plug 122 may additionally or alternatively contain contacts 106 with similar structure and function to those described herein. In example embodiments, one or more of the contacts 106 may not extend along a linear path and may be curvilinear.

The electronic connectors and plugs as described herein provide many benefits and advantages over existing products. For example, the flexible region 130 allows for insertion of the plug 104 when the receptacle's access is in any way constrained (e.g., neutral axis of the plug is offset from the neutral axis of the receptacle). Also, flexible region 130 allows for the plug's insertion into a receptacle (electronic or non-electronic) that may have a non-linear internal configuration. Therefore, this provides greater possible applications of electronic connectors in electronic devices that may require differently shaped, sized, and/or oriented electronic connectors. As one example, the flexible region 130 provides flexing of the plug 104 to better match the shape, size, orientation, and/or conditions of use of certain electronic devices and/or certain parts of such devices. One such configuration is shown in FIG. 15, in which the device is used in athletic activity monitoring, and wherein the plug provides not only for electronic coupling with an electronic receptacle, but also provides a locking engagement during the device's use. In such a configuration, a flexible plug may present some benefits over the use of a rigid straight plug, such as providing easier insertion and better fit into the receptacle and better absorbing anticipated and consequential forces encountered in active/athletic use. As another example, the size and shape of the flexible region 130 can be customized to correspond to particular receptacles. As a further example, the size and shape of the flexible region 130 can be designed to improve the performance of the electronic connector, such as by improving the durability of the connector by helping absorb external forces and impacts near or around the area of connection. Such impacts may often occur with certain electrical devices, and a flexible plug can often absorb such impacts better than a rigid straight plug. The flexible region 130 may also improve the aesthetics of an electronic device by eliminating the design constraints associated with a rigid electronic connector. Further benefits and advantages are recognized by those skilled in the art.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. An electronic connector, the electronic connector being configured for removable insertion into an electronic receptacle, comprising:
 a housing; and
 a plug extending from the housing,
  the plug including: (a) a flexible region formed of a flexible material and (b) a rigid region, wherein the flexible region comprises a flexible beam and the rigid region comprises a contact carrier, wherein the flexible beam extends between the housing and the contact carrier, wherein the contact carrier comprises a plurality of platforms separated by a plurality of recesses that are recessed with respect to the platforms, wherein the flexible material at least partially fills the recesses, and wherein the flexible region is configured to provide flexing of the plug up to an angle of at least +/−10 degrees from a natural state.

2. The electronic connector as claimed in claim 1, wherein the flexible region is configured to provide flexing of the plug up to an angle of at least +/−30 degrees from the natural state.

3. The electronic connector as claimed in claim 1, wherein the flexible region is configured to provide flexing of the plug up to an angle of at least +/−60 degrees from the natural state.

4. The electronic connector as claimed in claim 1, wherein the flexible region is configured to provide flexing of the plug up to an angle of at least +/−90 degrees from the natural state.

5. The electronic connector as claimed in claim 1, further comprising one or more leads, at least one of said leads being at least partially embedded within the flexible beam.

6. The electronic connector as claimed in claim 1, wherein the plug is further configured for insertion into a non-electronic receptacle having a curved insertion path.

7. The electronic connector as claimed in claim 1, wherein the flexible region is formed of one or more materials having a hardness of between 60-100 Shore A.

8. The electronic connector as claimed in claim 1, wherein the rigid region is formed of one or more materials having a hardness of at least 70 Shore D.

9. An electronic device comprising:
a housing;
a printed circuit board at least partially within the housing;
a plurality of leads in communication with the printed circuit board and extending from the housing; and
a connector comprising:
a plug connected to the housing and extending from the housing and having a plurality of exposed contacts connected to the leads, wherein the plug is configured for insertion into a receptacle to place the contacts in communication with the receptacle and enable electronic communication between the plug and the receptacle;
wherein the plug comprises a flexible region and a rigid region, wherein the flexible region comprises a flexible beam and the rigid region comprises a contact carrier, wherein the flexible beam extends between the housing and the contact carrier, wherein the contact carrier comprises a plurality of platforms separated by a plurality of recesses that are recessed with respect to the platforms, wherein the plurality of exposed contacts are supported by the plurality of platforms, wherein the flexible material at least partially fills the recesses, and wherein the flexible region is configured to provide flexing of the plug up to an angle of at least +/−10 degrees from a natural state.

10. The electronic device claimed in claim 9, wherein the electronic device is a flash memory drive.

11. The electronic device claimed in claim 9, wherein the electronic device is a USB plug.

12. The electronic device claimed in claim 9, wherein the electronic device is an athletic performance monitoring device.

13. The electronic device claimed in claim 9, wherein the electronic device is a watch having a controller and a user interface and a plurality of user inputs operably associated with the controller.

14. The An-electronic device claimed in claim 9, wherein the flexible region is configured to provide flexing of the plug up to an angle of at least +/−30 degrees from the natural state.

15. The electronic device claimed in claim 9, wherein the flexible region is configured to provide flexing of the plug up to an angle of at least +/−60 degrees from the natural state.

16. The electronic device claimed in claim 9, wherein the flexible region is configured to provide flexing of the plug up to an angle of at least +/−90 degrees from the natural state.

17. The electronic device claimed in claim 9, wherein the contact carrier is connected to the flexible region and extends from the flexible region, and wherein the contacts are at least partially mounted on the contact carrier.

18. The electronic device claimed in claim 17, wherein the flexible beam is connected to the housing and the contact carrier.

19. The electronic device claimed in claim 18, wherein the leads are at least partially embedded within the flexible beam.

20. The electronic device claimed in claim 9, wherein the electronic device further includes a non-electronic receptacle, wherein the plug is configured to be removably received within the non-electronic receptacle.

21. The electronic device claimed in claim 9, wherein the flexible region is formed of one or more materials having a hardness of between 60-100 Shore A.

22. A method for manufacturing an electronic connector comprising:
assembling a housing, a plurality of conductive members, and a contact carrier, such that the conductive members extend from the housing and are engaged with the contact carrier;
molding a flexible polymer material around the conductive members and the contact carrier to connect the contact carrier to the housing and to form a plug extending from the housing, the plug comprising a flexible region including the flexible polymer material and a rigid region including the contact carrier, wherein the flexible region comprises a flexible beam, wherein the flexible beam extends between the housing and the contact carrier, wherein the contact carrier comprises a plurality of platforms separated by a plurality of recesses that are recessed with respect to the platforms, wherein the flexible polymer material at least partially fills the recesses, wherein the flexible region is configured to provide flexing of the plug up to an angle of at least +/−10 degrees from a natural state;
wherein the conductive members have: (a) exposed portions forming contacts on an outer surface of the plug that are supported by the plurality of platforms of the contact carrier and (b) embedded portions forming leads extending from the contacts to the housing through the flexible polymer material, and wherein the plug is configured for insertion into a receptacle to place the contacts in communication with the receptacle and enable electronic coupling between the plug and the receptacle.

23. The method for manufacturing an electronic connector as claimed in claim 22, wherein the flexible polymer material connects the housing and the contact carrier.

* * * * *